United States Patent [19]
Challener et al.

[11] Patent Number: 6,046,733
[45] Date of Patent: Apr. 4, 2000

[54] COMPUTER INPUT STYLUS AND THICKNESS CONTROL SYSTEM

[75] Inventors: David Carroll Challener, Raleigh; Palmer E. Newman, Apex, both of N.C.

[73] Assignee: International Business Machines Corporation, Armonk, N.Y.

[21] Appl. No.: 08/996,552

[22] Filed: Dec. 23, 1997

[51] Int. Cl.[7] .................................................. G09G 5/00
[52] U.S. Cl. ........................................ 345/179; 178/18.11
[58] Field of Search ..................................... 345/179, 180, 345/182, 183, 150; 178/18.01, 18.11, 19.05

[56] References Cited

U.S. PATENT DOCUMENTS

| | | | |
|---|---|---|---|
| 4,922,236 | 5/1990 | Heady | 345/166 |
| 5,646,650 | 7/1997 | Miller et al. | 345/179 |

*Primary Examiner*—Richard A. Hjerpe
*Assistant Examiner*—Benjamin D. Bowers
*Attorney, Agent, or Firm*—George E. Grosser; Andrew J. Dillon

[57] ABSTRACT

A computer-input stylus which provides thickness control when utilized in conjunction with a computer-implemented software-based drawing application. The input stylus includes a cylindrical body in a conical tip. A color display within the stylus is utilized to illuminate the conical tip with a color indicative of a currently selected color within the software-based drawing application, providing visual color feedback. Thickness selection is accomplished utilizing a thickness selection input actuator mounted to the cylindrical body of the input stylus. The thickness selection input actuator is utilized to vary the thickness of application of a selected color or pattern, while physically varying the thickness of the conical tip of the input stylus, in a manner analogous to utilizing a thicker tip brush.

10 Claims, 4 Drawing Sheets

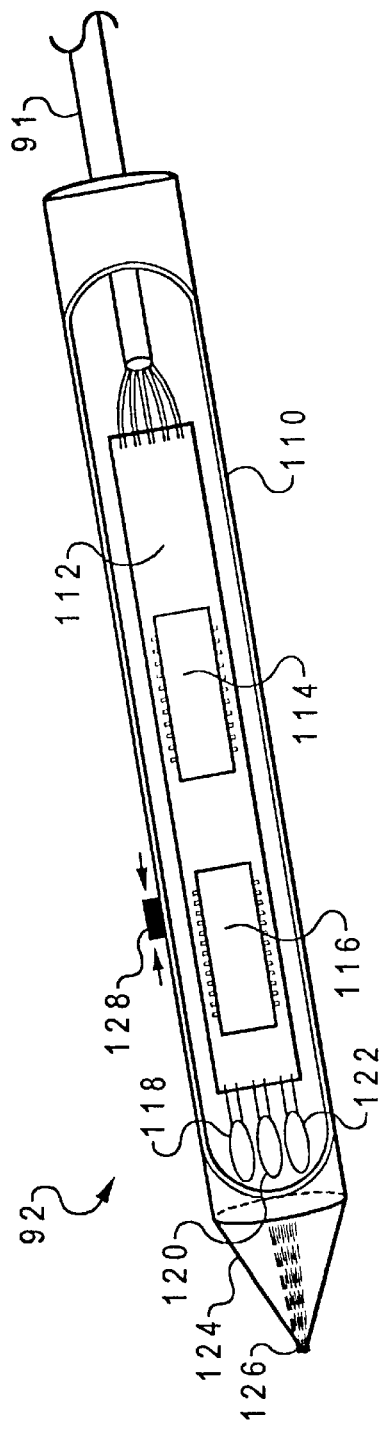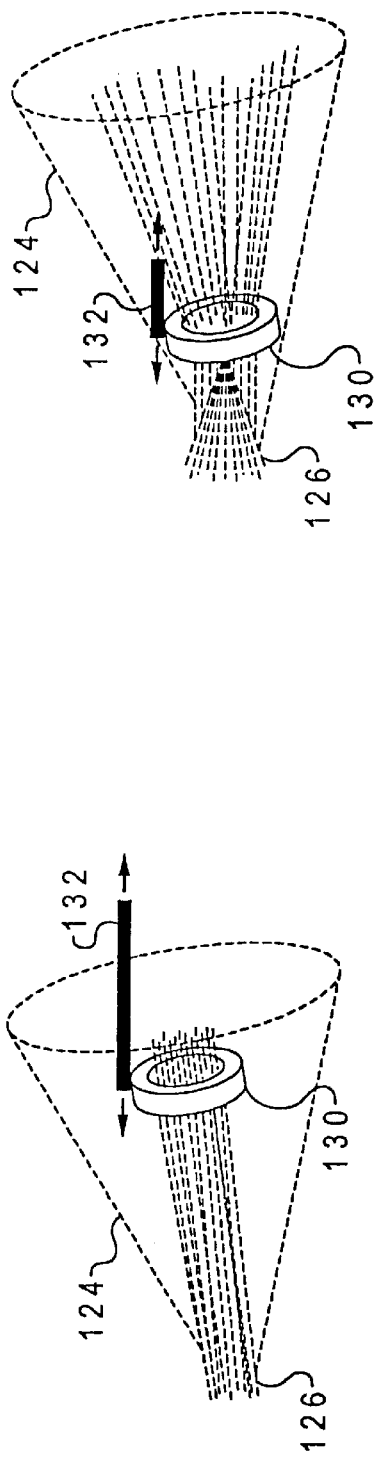

COMPUTER INPUT STYLUS AND THICKNESS CONTROL SYSTEM

BACKGROUND OF THE INVENTION

1. Technical Field

The present invention relates in general to an improved computer system and in particular to improvements in computer-implemented drawing applications. Still more particularly, the present invention relates to a system for providing input stylus thickness control in a computer-implemented drawing application.

2. Description of the Prior Art

Modern computer systems are finding application in many diverse areas of the traditional workplace. Computer systems and associated software applications are commonly utilized in database creation/management, accounting systems, word processing and other typical office processes.

More recently, computer systems are finding application in non-traditional computer applications such as music, architecture and the arts. Many different software applications are available which permit a computer user to compose and play musical compositions, draft and revise three-dimensional architectural plans and create or "paint" artistic compositions.

Computer-implemented drawing programs commonly utilize a so-called "graphical pointing device" to designate locations within a computer display for "painting" a portion of an artistic composition. One example of such a "graphical pointing device" is the "mouse." Utilizing a mouse, a user may graphically select commands or options and/or designate locations within the computer display for application of such commands and options.

Another common computer input device for utilization with computer-implemented drawing applications is the light pen or stylus. Such a device is typically utilized in conjunction with an input pad or the surface of the computer display to enter graphic elements into a computer-created drawing. Typically, a color or pattern is selected from a palette or menu within the drawing application utilizing key strokes or mouse clicks, and that color or pattern is then applied to locations within the computer display utilizing the light pen or stylus.

While the aforementioned approach works well, it is non-analogous to the real world in that the artist must constantly divert his or her gaze from the work in progress to the computer-provided color palette in order to verify that the appropriate color, texture and thickness have been selected.

It therefore should be apparent that it would be advantageous to provide an input device for computer-based drawing applications which allows the user to quickly and efficiently select and change thickness.

SUMMARY OF THE INVENTION

It is therefore one object of the present invention to provide an improved computer system.

It is another object of the present invention to provide an improved computer-implemented drawing application.

It is yet another object of the present invention to provide a system for providing input stylus thickness control in a computer-implemented drawing application. The foregoing objects are achieved as is now described.

A computer-input stylus is provided which provides thickness control when utilized in conjunction with a computer-implemented software-based drawing application. The input stylus includes a cylindrical body and a conical tip. A color display within the stylus is utilized to illuminate the conical tip with a color indicative of a currently selected color within the software-based drawing application, providing visual color feedback. Thickness selection is accomplished utilizing a thickness selection input actuator mounted to the cylindrical body of the input stylus. The thickness selection input actuator is utilized to vary the thickness of application of a selected color or pattern, while physically varying the thickness of the conical tip of the input stylus, in a manner analogous to utilizing a thicker tip brush.

The above, as well as additional objectives, features and advantages of the present invention, will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 3 is a partially cutaway pictorial version of the computer-input stylus of the present invention;

FIGS. 4A and 4B are partially schematic pictorial views of the variable thickness conical tip of the computer-input stylus of the present invention.

DESCRIPTION OF THE PREFERRED EMBODIMENT

Figure 1:
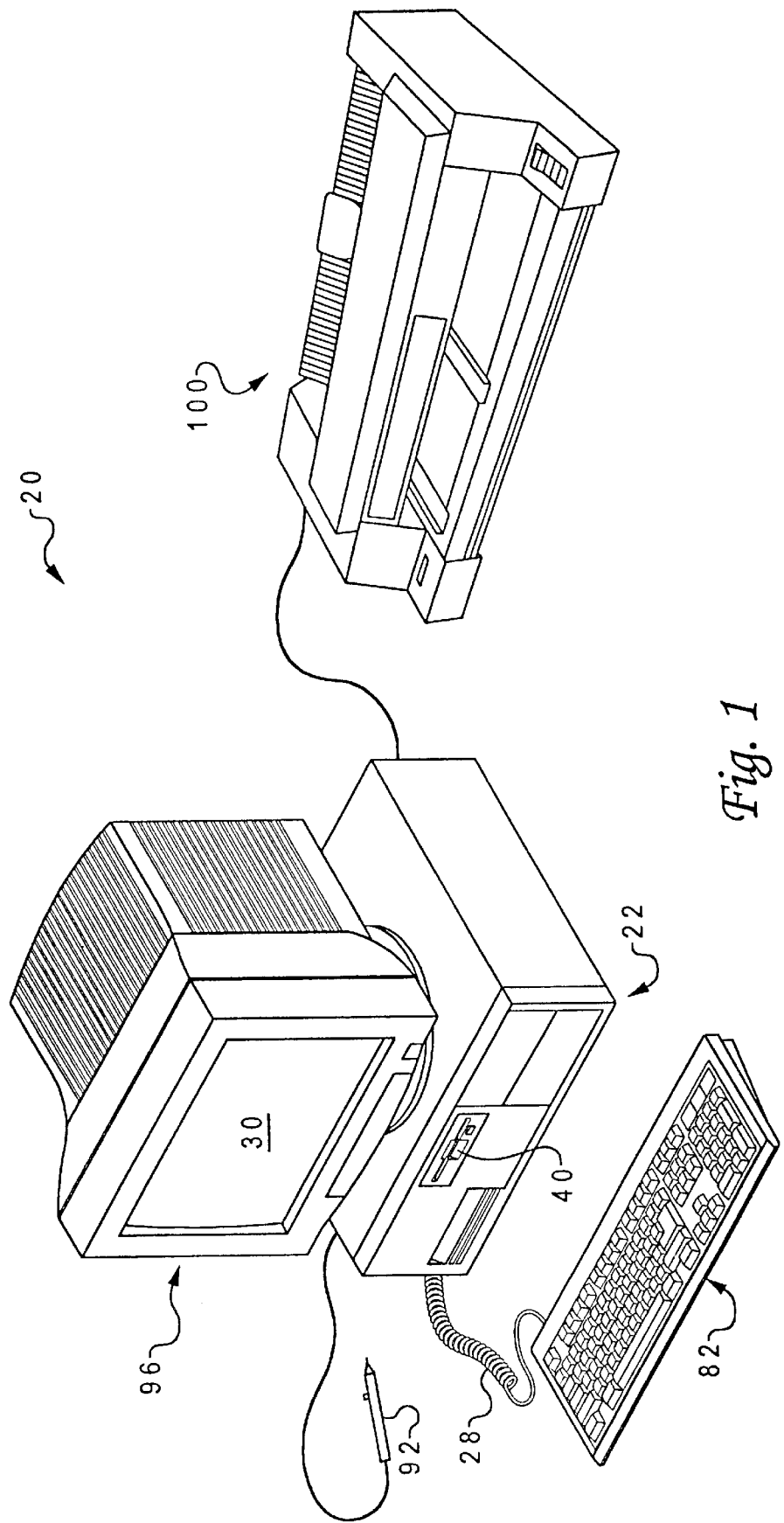
FIG. 1 is a pictorial view of a computer system which may be utilized to implement the computer input stylus of the present invention.

With reference now to the figures and, in particular, with reference to FIG. 1, there is depicted a data processing system 20 which may be utilized to practice the present invention. As illustrated, data processing system 20 includes processor 22, keyboard 82 and display 96. Keyboard 82 is coupled to processor 22 by cable 28. Display 96 includes a display screen 30, which may be implemented utilizing a cathode ray tube (CRT), a liquid crystal display (LCD), an electrode luminescent panel or other similar display device. The data processing system 20 also may include a pointing device which may be implemented utilizing a trackball, joystick, touch-sensitive tablet or screen, track path or, as illustrated, a mouse. Processor 22 also may be coupled to one or more peripheral devices such as a modem, CD-ROM or network adapter (not shown) or a floppy disk drive 40, which may be internal or external to the enclosure of processor 22. An output device such as printer 100 also may be coupled to processor 22.

Additionally, in accordance with an important feature of the present invention, a computer-input stylus 92 also is coupled to processor 22. Computer-input stylus 92 may be utilized, in a manner which will be set forth in greater detail herein, to draw or "paint" an artistic composition on display screen 30 within display 96. It also should be noted and recognized by those persons of ordinary skill in the art that display 96 and keyboard 82 may be implemented utilizing any one of several known standard available components.

Figure 2:
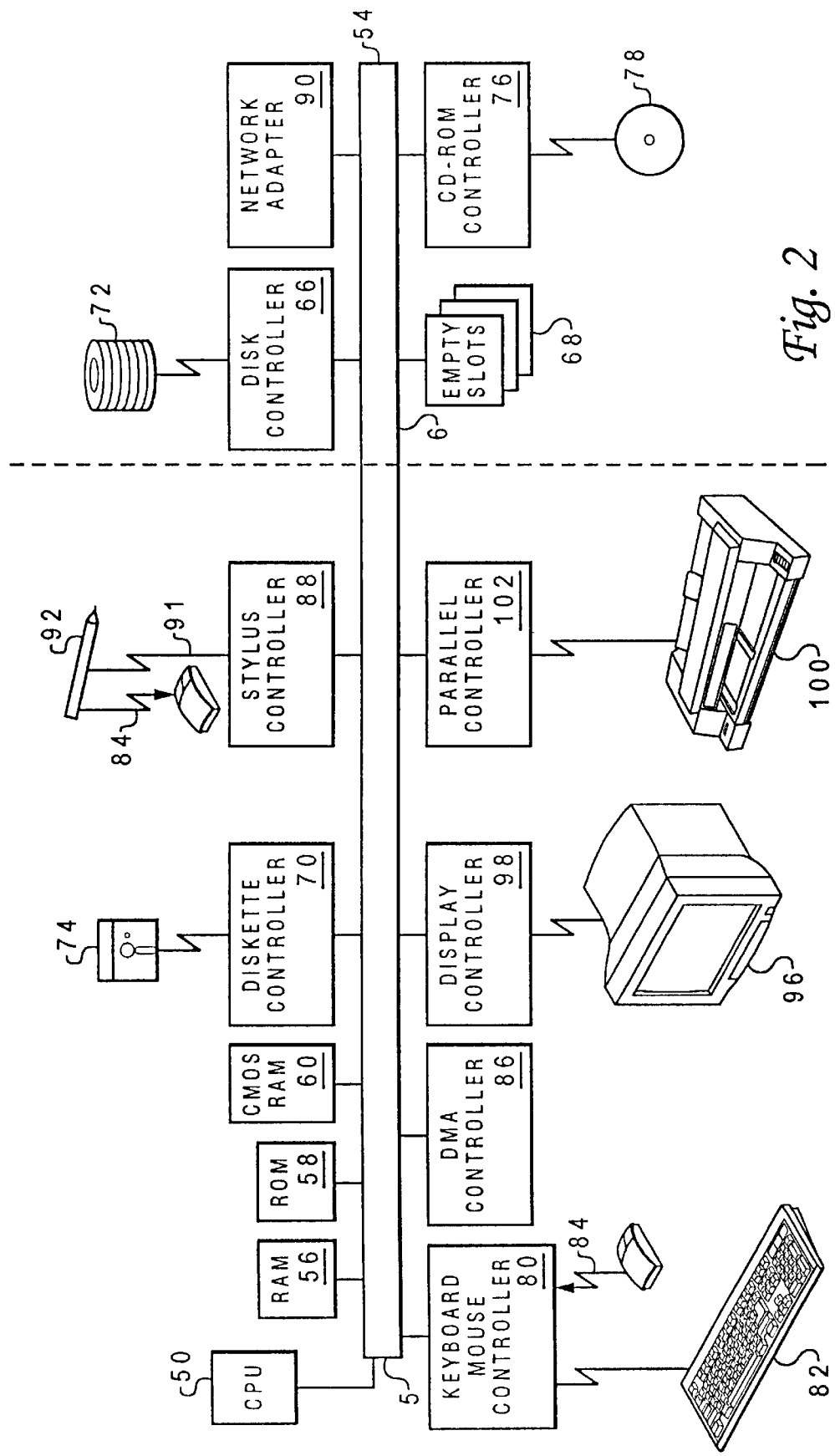
FIG. 2 is a high-level block diagram of the computer system of FIG. 1.

Referring now to FIG. 2, there is depicted a high-level block diagram which illustrates selected components which may be included within data processing system 20 of FIG. 1 in accordance with the teachings of the present invention. As depicted, data processing system 20 is preferably controlled primarily by computer-readable instructions, which may be in the form of software, wherever or by whatever means such software is stored or accessed. Such software may be executed within central processing unit (CPU) 50 to cause data processing system 20 to do work. For example, in accordance with an important feature of the present invention, a computer-implemented software drawing application may be stored within memory within data processing system 20 and executed within central processing unit (CPU) 50 to assist in the creation of an artistic composition within data processing system 20.

Memory devices coupled to system bus 5 include random-access memory (RAM) 56, read-only memory (ROM) 58 and nonvolatile memory 60. Such memories include circuitry that allows information to be stored and retrieved. Read-only memory contains data which cannot be modified. Data stored within random-access memory can be changed by CPU 50 or other hardware devices. Non-volatile memory is memory that does not lose data when power is removed. Non-volatile memories include ROM, E-PROM, flash memory or battery-pack CMOS RAM. As shown in FIG. 2, such battery-pack CMOS RAM may be used to store configuration information.

An expansion card or board is a circuit board which includes chips or other electronic components which, when connected to a data processing system, add functions or resources to that system. Typically, such expansion cards may add memory, disk-drive controllers 66, video support, parallel and serial ports and internal modems. For laptop, palmtop and other portable computers, expansion cards usually take the form of PC cards, which are credit-card-sized devices designed to plug into a slot in the side or back of a computer. One example of such a slot is the PCMCIA slot (Personal Computer Memory Card International Association) which defines type I, II and III card slots. Thus, empty slots 68 depicted within FIG. 2 may be utilized to receive various types of expansion cards or PCMCIA cards.

Disk controller 66 and diskette controller 70 both include special purpose integrated circuits and associated circuitry which direct and control reading from and writing to hard disk drive 72 and floppy disk or diskette 74, respectively. Such disk controllers handle tasks such as positioning read/write heads, mediating between the drive and CPU 50, and controlling the transfer of information to and from memory. A single disk controller may be able to control more than one disk drive.

CD-ROM controller 76 may be included in data processing system 20 for reading data from CD-ROM 78 (compact disk read-only memory). Such CD-ROMs use laser optics rather than magnetic means for reading data. Keyboard/mouse controller 80 is provided in data processing system 20 for interfacing with keyboard 82 and communications link 84. Communications link 84 may be coupled to a pointing device which may be used to control an on-screen element such as a graphical pointer or cursor, which may take the form of an arrow having a hotspot that specifies the location of the pointer when the user presses a mouse button. Other pointing devices, including graphics tablets, joysticks, trackballs, trackpads and the pointing device sold under the trademark "Track Point" by International Business Machines Corporation also may be utilized.

In accordance with an important feature of the present invention, data processing system 20 may communicate with stylus 92 utilizing stylus controller 88. Stylus controller 88 is typically attached to system bus 5 in the form of a serial port. Additionally, communications link 91 between stylus 92 and stylus controller 88 may take the form of a wire cable, an infrared link or a radio-frequency link, utilizing communication techniques which are well-known to those having ordinary skill in the art. As is typical with serial ports, stylus controller 88 transmits information between CPU 50 and stylus 92 one bit at a time over a single line. Serial communication may be synchronous (controlled by some standard such as a clock) or asynchronous (managed by the exchange of control signals that govern the flow of information). Examples of serial communication standards include RS-232 interface and the RS-422 interface. As illustrated, stylus controller 88 then may be utilized to communicate with stylus 92.

However, as those having ordinary skill in the art will appreciate upon reference to the present disclosure, stylus 92 also may communicate with data processing system 20 via a parallel port if such communication is desired. The equivalence of communication between a peripheral device and a processing system via serial or parallel ports is well-known to those having ordinary skill in the art.

In the depicted embodiment of the present invention, stylus 92 includes a thickness selection input actuator which is preferably coupled to keyboard mouse controller 80 via communications link 84, to control thickness selection in a manner which will be explained in greater detail herein.

Network adapter 90 also may be utilized to connect data processing system to a local area network. Local area networks may provide computer users with a means for communicating and transferring software and information electronically. Additionally, such network may provide distributed processing, which involves several computers in the sharing of workloads or cooperative efforts in performing a task.

Display 96, which is controlled by display controller 98, is utilized to display visual output generated by data processing system 20. Such visual output may include text, graphics, animated graphics and video. Display 96 may be implemented with a cathode-ray-tube-based video display, a liquid-crystal-based flat panel display or a gas-plasma-based flat panel display. Display controller 98 preferably includes electronic components which are required to generate video signals which are sent to display 96 and which are necessary to detect the presence of the tip of stylus 92 at various locations on display screen 30.

Printer 100 also is depicted as coupled to data processing system 20 via parallel controller 102. Printer 100 may be utilized to put text or other computer-generated images, or combinations thereof, on paper or on another medium such as a transparency sheet. Other types of printers may include an image setter, a plotter or a film recorder.

Parallel controller 102 may be utilized to send multiple data and control bits simultaneously over a plurality of wires connected between system bus 5 and another parallel communication device, such as printer 100, or stylus 92.

Thus, as depicted, CPU 50 fetches, decodes and executes instructions and transfers information to and from other resources via the computer's main data-transfer path system bus 5. Such a bus connects the components in a data processing system 20 and defines the medium for data exchange. System bus 5 connects together and allows for the exchange of data between memory units 56, 58 and 60; CPU 50; and other devices depicted within FIG. 2. Those skilled in the art will appreciate that a data processing system constructed in accordance with the present invention may have multiple components selected from the foregoing, including multiple processors.

With reference now to FIG. 3, there is depicted a partially cutaway pictorial view of computer input stylus 92 of the present invention. As depicted, computer-input stylus 92 may be connected to data processing system 20 via communications link 91 which may be implemented utilizing a wire, infrared or radio frequency link to data processing system 20, and computer-input stylus 92 may be connected to keyboard mouse controller 80 via communications link 84.

As illustrated, computer-input stylus 92 includes a cylindrical body 110 and a conical stylus tip 124. Depicted in the cutaway portion of cylindrical body 110 is a printed circuit board 112 which serves to mount various electronic components including communications circuit 114 and color driver circuit 116. Also mounted to printed circuit board 112 are multiple light-emitting diodes. Specifically, red light-emitting diode 118, green light-emitting diode 120 and blue light-emitting diode 122. In accordance with an important feature of the present invention, when a color value is selected from the computer-based palette of a software-based drawing application, control signals indicative of that color value are transferred from data processing system 20 to computer-input stylus 92 via communications link 91. Those signals are received by communications circuit 114 and translated into control signals for use by color driver 116.

Thus, in the depicted embodiment of the present invention, pulses of varying widths may be applied to each light-emitting diode in turn, and in a manner well-known to those having skill in the color-graphics art, by combining various-level outputs from each of the three primary-color light-emitting diodes, it will be possible to create a resultant color which is identical to the color selected within the computer-based palette of the computer-implemented software-based drawing application.

Of course, those having ordinary skill in the art will appreciate that production tolerances in light-emitting diodes may vary, and it may be necessary to calibrate the output of light-emitting diodes 118, 120 and 122. This may be simply and easily accomplished prior to utilizing color-input stylus 92 by comparing the resultant output color with a display color present: on display screen 30 of display 96 in order to achieve the desired color level.

Next, in accordance with an important feature of the present invention, a bundle of fiber-optic cables 126 is mounted within conical stylus tip 124. One end of the bundle of fiber-optic cables 126 extends from the tip of conical stylus tip 124 and serves as the output point for computer-input stylus 92. The remaining ends of the bundle of fiber-optic cables 126 are variably mounted in the vicinity of light-emitting diodes 118, 120 and 122 and receive, from those diodes, radiation which, when combined, results in the production of a selected color which matches the color selected within the computer-implemented software drawing application.

In this depicted embodiment of the present invention, conical stylus tip 124 is preferably provided having a mirrored inner surface so that light emitted by light-emitting diodes 118, 120 and 122 will be primarily absorbed by the bundle of fiber-optic cables 126 and output at the extended tip thereof. In this manner, as those skilled in the art will appreciate upon reference thereto, the tip of computer-input stylus 92 will be illuminated with a color which is identical to the color selected from the computer-based palette within the drawing application and the tip of the bundle of fiber-optic cable 126 will be indicative of the thickness of the color to be applied. Thus, the artist utilizing computer-input stylus 92 can perceive the color which is about to be applied and the thickness of application by viewing the tip of the stylus in a manner analogous to viewing the tip of a paintbrush which has been dipped into a selected paint color.

Next, in accordance with an important feature of the present invention, computer-input stylus 92 includes a thickness selection input actuator 128. As illustrated, thickness selection input actuator 128 is a switch which can be repositioned manually to vary the physical thickness of the tip of computer-input stylus 92. In this manner, as will be explained in greater detail below, thickness selection input actuator 128 may be utilized to select and/or vary a thickness of color application from among the thicknesses available within a computer-provided color palette.

Referring now to FIGS. 4A and 4B, there are depicted partially schematic pictorial views of the variable thickness conical tip of the computer-input stylus of the present invention.

As depicted, FIG. 4A illustrates conical tip 124 having a bundle of fiber-optic cables 126 mounted therein. As illustrated, one end of the bundle of fiber-optic cables 126 is constrained to a narrow tip by virtue of the aperture within conical stylus tip 124. The other end of the bundle of fiber-optic cables 126 is constrained by cylindrical member 130. Mounted to cylindrical member 130 is actuator member 132 which can be physically repositioned, in the directions indicated by the arrows at each end of actuator member 132. Actuator member 132 is preferably attached to thickness selection input actuator 128 (not shown in this figure) and may be repositioned at various points within conical stylus tip 124 in a manner which will be shown in greater detail herein.

Next, referring to FIG. 4B, it can be seen that thickness selection input actuator 128 has been moved forward, toward conical stylus tip 124, urging cylindrical member 130 and actuator member 132 forward. In this manner, the bundle of fiber-optic cables 126 will be physically deformed as the interior ends of the bundle of fiber-optic cables 126 are allowed to spread, or are urged into a spread position by bias means (not shown).

With the repositioning of cylindrical member 130 by means of the movement of actuator member 132 the end of the bundle of fiber-optic cables 126 which protrudes from conical stylus tip 124 are spread, providing a physical analogy to the utilization of a broader brush in the physical world.

As should be evident upon review of FIGS. 4A and 4B, the physical movement of thickness selection input actuator 128 may be translated into a variation in the thickness of the exposed end of the bundle of fiber-optic cables 126. As noted above, the bundle of fiber-optic cables 126 is illuminated and thus, the illuminated tip of computer-input stylus 92 will be physically broader, greatly enhancing the real world analogy of a broader brush.

Of course, in the depicted embodiment of the present invention, thickness selection input actuator 28 will be physically connected to actuator member 132, as well as physically connected to a variable resistor or other electronic indicator which may be utilized to provide a signal to CPU 50 to indicate the effective breadth of the tip of computer-input stylus 92. Thus, as computer-input stylus 92 is utilized, thickness selection input actuator 128 may be manually varied in its position, physically altering the tip of computer-input stylus 92 while simultaneously altering the effect of computer-input stylus 92 on display screen 30.

Figure 5:
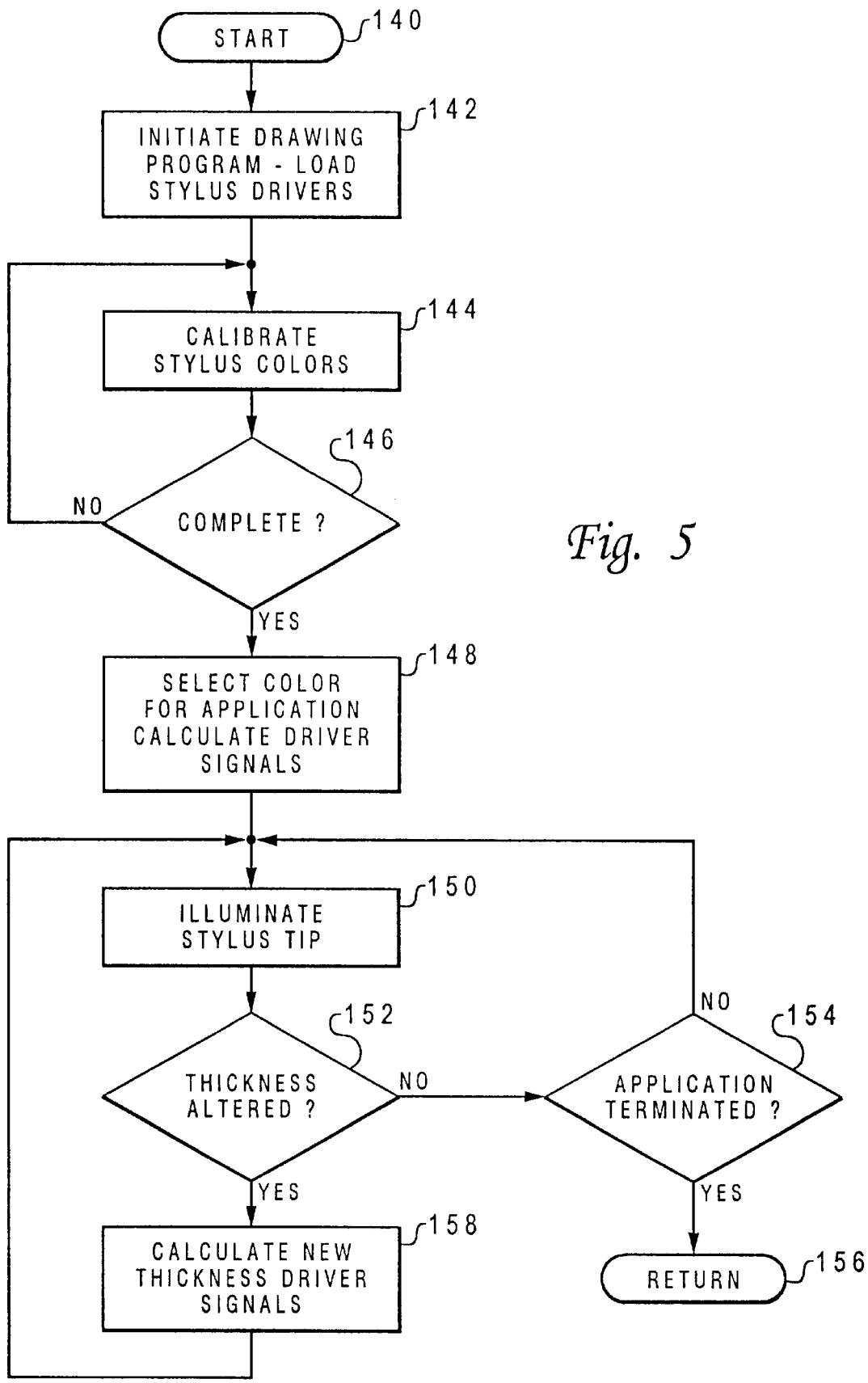
FIG. 5 is a high-level logic flowchart illustrating a process for controlling the selection of thickness utilizing the computer-input stylus of the present invention.

Finally, with reference to FIG. 5, there is depicted a high-level logic flowchart which illustrates a process for controlling the computer-input stylus of the present invention. As depicted, this process begins at block 140, thereafter passing to block 142. Block 142 illustrates the initiation of the software-based drawing program and the loading of stylus drivers. Those having ordinary skill in the art will appreciate that such stylus drivers will be drivers which will generate the necessary control signals to create a color illumination within the tip of computer-input stylus 92 which corresponds to the color selected within the drawing program. Next:, the process passes to block 144.

Block 144 illustrates the calibration of the stylus colors. This may be accomplished, as discussed above, by comparing the tip of computer-input stylus 92 to a display within the display screen 30 of data processing system 20 and varying the output to achieve a match. The currents applied to each of the light-emitting diodes may be carefully adjusted to achieve calibration which overcomes any process irregularities. In a preferred embodiment of the present invention, such calibration data may be stored within computer memory, and calibration will not be required on a frequent basis. Additionally, computer-input stylus 92 may be implemented utilizing the ICM (Image Color Matching) protocols in Windows 95, a trademark of the Microsoft Corporation of Redmond, Washington.

Next, the process passes to block 146 for a determination of whether or not the calibration process is complete. If not, the process merely iterates until such time as calibration has occurred. After calibration is complete, the process passes to block 148. Block 148 illustrates the selection of a color by the user from the computer-based color palette utilized with the drawing program selected for implementation. Thereafter, the process passes to block 150.

Block 150 illustrates the illumination of the stylus tip in a manner set forth above with respect to FIGS. 3 and 4. Thereafter, the process passes to block 152. Block 152 illustrates a determination of whether or not a movement of thickness selection input actuator 128 has been detected, indicating new thickness parameters have been selected. If new thickness parameters have not been selected, the process passes to block 154. Block 154 illustrates a determination of whether or not the application has terminated and, if not, the process returns in an iterative fashion to block 150 and continues to illuminate the tip of computer input stylus 92. If, however, the application has been terminated, the process passes to block 156 and returns.

Referring again to block 152, in the event new thickness parameters have been selected by the user, as indicated by movement of thickness selection input actuator 128, the process passes to block 158. Block 158 illustrates the calculation of the new thickness driver signals, and those signals are then passed to computer input stylus 92, and the process returns in an iterative fashion to block 150, where the stylus tip continues to be illuminated with a color identical to the selected color.

Upon reference to the foregoing, those skilled in the art will appreciate that the Applicants have provided a computer input stylus in which the thickness of each stroke applied by the stylus can be varied by a user within a drawing application utilizing a thickness selection input actuator located on the stylus. In this manner, the stylus assumes a real-world analogy to a paintbrush in that the thickness of the stylus can be varied by the user to vary the thickness of a stroke of color as it is applied.

We claim:

1. A computer-input stylus for use with a computer-implemented software drawing application, said computer-input stylus comprising:
   a cylindrical body sized to be grasped by a human hand;
   a tip attached to said cylindrical body;
   a color display within said tip for illuminating said tip with a selected color indicative of a color currently selected within said software drawing application; and
   control means mounted to said cylindrical body for altering a physical dimension of said tip of said computer-input stylus.

2. The computer-input stylus according to claim 1 wherein said color display comprises a plurality of light-emitting diodes.

3. The computer-input stylus according to claim 1 further including communication means for coupling said control means to a computer.

4. The computer-input stylus according to claim 1 wherein said tip includes a bundle of fiber-optic cable.

5. The computer-input stylus according to claim 4 wherein said control means comprises means for varying a physical dimension of said bundle of fiber-optic cables.

6. A computer drawing system comprising:
   a processor;
   a display coupled to said processor for displaying images;
   a software drawing application operational within said processor for creating color images within said display in response to user inputs designating selected colors and locations; and
   an input stylus coupled to said processor for designating locations within said display, said input stylus comprising:
   a cylindrical body sized to be grasped by a human hand;
   a tip attached to said cylindrical body;
   a color display within said tip for illuminating said tip with a selected color indicative of a color currently selected within said software drawing application; and
   control means mounted to said cylindrical body for altering a physical dimension of said tip of said computer-input stylus.

7. The computer drawing system according to claim 6 wherein said color display comprises a plurality of light-emitting diodes.

8. The computer drawing system according to claim 6 further including a communications means for coupling said control means to said processor.

9. The computer drawing system according to claim 6 wherein said tip includes a bundle of fiber-optic cables.

10. The computer drawing system according to claim 9 wherein said control means comprises means for varying a physical dimension of said bundle of fiber-optic cables.

* * * * *